(12) United States Patent
Ni et al.

(10) Patent No.: US 11,622,173 B2
(45) Date of Patent: Apr. 4, 2023

(54) LENS DRIVING DEVICE

(71) Applicant: Changzhou AAC Raytech Optronics Co., Ltd., Changzhou (CN)

(72) Inventors: Tianheng Ni, Shenzhen (CN); Rongfu Xie, Shenzhen (CN); Feng Yan, Shenzhen (CN); Gang Li, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/523,936

(22) Filed: Nov. 11, 2021

(65) Prior Publication Data

US 2022/0150412 A1  May 12, 2022

(30) Foreign Application Priority Data

Nov. 11, 2020 (CN) .......................... 202022596186.5

(51) Int. Cl.
| | |
|---|---|
| *H04N 5/232* | (2006.01) |
| *G03B 5/00* | (2021.01) |
| *H04N 5/225* | (2006.01) |
| *G03B 17/12* | (2021.01) |
| *H04N 23/68* | (2023.01) |
| *H04N 23/51* | (2023.01) |

(52) U.S. Cl.
CPC ............ *H04N 23/687* (2023.01); *G03B 5/00* (2013.01); *G03B 17/12* (2013.01); *H04N 23/51* (2023.01); *G03B 2205/0053* (2013.01)

(58) Field of Classification Search
CPC ............ G03B 17/12; G03B 2205/0015; G03B 2205/0053; G03B 2205/0069; G03B 29/00; G03B 5/00; G03B 5/04; H04N 5/2252; H04N 5/2253; H04N 5/2254; H04N 5/23287
See application file for complete search history.

(56) References Cited

U.S. PATENT DOCUMENTS

| | | | |
|---|---|---|---|
| 10,976,568 B1 * | 4/2021 | Fujisaki | H04N 5/2254 |
| 2012/0219276 A1 * | 8/2012 | Suzuka | H04N 5/2328 396/55 |
| 2020/0174274 A1 * | 6/2020 | Wang | G02B 27/646 |
| 2021/0203851 A1 * | 7/2021 | Fujisaki | G03B 30/00 |
| 2021/0278693 A1 * | 9/2021 | Kasahara | G02B 27/646 |
| 2021/0281759 A1 * | 9/2021 | Seo | H04N 5/23287 |

\* cited by examiner

*Primary Examiner* — Amy R Hsu
(74) *Attorney, Agent, or Firm* — W&G Law Group

(57) ABSTRACT

The present invention provides a lens driving device including a first supporting framework, a second supporting framework, a lens barrel, a bracket assembly which is rotatably connected with the first supporting framework, the first supporting framework is rotatably connected with the second supporting framework; anti-shake magnets fixed on two adjacent first side walls; anti-shake coils fixed on two adjacent second side walls; a flexible printed circuit fixed at a peripheral side of the second supporting framework and electrically connected with the anti-shake coils; and metal sheets respectively opposite to and spaced from two anti-shake magnets and generating mutual magnetic attraction with the anti-shake magnets. Compared with the related art, the lens driving device of the present invention has a simple structure and low production cost.

6 Claims, 5 Drawing Sheets

C-C

LENS DRIVING DEVICE

TECHNICAL FIELD

The present invention relates to a driving device, in particular to a lens driving device.

BACKGROUND

With the development of a photographing technique, lens driving devices are widely applied to various photographing devices. The combination of lens driving devices and various sets of portable electronic equipment such as mobile phones, cameras, and computers are even more popular in consumers.

An anti-shake coil and an anti-shake magnet of a lens in the related art are arranged oppositely along an optical axis of the lens, when a current is applied to the anti-shake coil, the anti-shake coil and the anti-shake magnet generate an electromagnetic field, and then the anti-shake coil that is subjected to the Lorentz force of the electromagnetic field will drive the anti-shake magnet to move in the direction perpendicular to the optical axis, thereby driving a lens barrel to achieve the OIS anti-shake performance, and an elastic structure such as a suspension wire that supports the lens barrel is configured to provide an anti-shake restoring force. However, this anti-shake structure will usually expand the size of the lens along the optical axis.

In addition, in order to further improve the anti-shake sensitivity, the OIS function of the lens driving device of the related art adopts a form of a metal spherical surface contact, but a manufacturing process of a metal spherical surface is complicated and the cost is relatively high.

Therefore, it is necessary to provide a new lens driving device to solve the above-mentioned problems.

SUMMARY

The technical problems to be solved in the present invention are to provide a lens driving device with a simple structure and low production cost.

In order to solve the above-mentioned technical problems, the present invention provides a lens drive lens, which comprises:

a first supporting framework enclosed by a first side wall into a rectangular structure having an accommodating space;

a second supporting framework enclosed by a second side wall into a rectangular structure, wherein the second supporting framework is sleeved on the first supporting framework and spaced from the first supporting framework;

a lens barrel accommodated in the accommodating space, wherein the lens barrel is connected with the first supporting framework, and configured for mounting a lens;

a bracket assembly which is rotatably connected with the first supporting framework in such a way that the first supporting framework is rotatable around a first direction relative to the bracket assembly, and the bracket assembly is rotatably connected with the second supporting framework and suspends the first supporting framework in the second supporting framework in such a way that the bracket assembly is capable of driving the first supporting framework to jointly rotate around a second direction relative to the second supporting framework, the first direction and the second direction being perpendicular to the optical axis and being respectively parallel to two diagonals of the first supporting framework;

at least two anti-shake magnets respectively fixed on two adjacent first side walls;

at least two anti-shake coils respectively fixed on two adjacent second side walls, wherein each anti-shake coil and one corresponding anti-shake magnet being opposite to and spaced from each other and jointly driving the first supporting framework to deflect around the first direction or the second direction;

a flexible printed circuit fixed at a peripheral side of the second supporting framework and electrically connected with the anti-shake coils; and at least two metal sheets respectively opposite to and spaced from the two anti-shake magnets and generating mutual magnetic attraction with the anti-shake magnets.

Preferably, the bracket assembly comprises a bracket, two first guide pillars, and two second guide pillars; wherein the bracket includes a rectangular annular bracket body, a plurality of first supporting walls respectively extending in a bent manner from one group of diagonal positions of the bracket body, and a plurality of second supporting walls respectively extending in a bent manner from the other group of diagonal positions of the bracket body; the first supporting walls and the second supporting walls are spaced from the first supporting framework; the two first guide pillars extend along the first direction and are spaced from each other; the two second guide pillars extend along the second direction and are spaced from each other; the bracket body is located at a top end of the lens barrel and spaced from the lens barrel; the first supporting walls are rotatably connected to the first supporting framework through the first guide pillars; the second supporting walls are arranged between the first supporting framework and the second supporting framework in a spacing manner and rotatably connected to the second supporting framework through the second guide pillars.

Preferably, the bracket is made of a steel sheet.

Preferably, a central line of the anti-shake magnets, central axes of the first guide pillars, and central axes of the second guide pillars are flush in the optical axis direction.

Preferably, the first supporting framework further comprises first accommodating holes respectively running through two first side walls along the direction perpendicular to the optical axis, and the anti-shake magnets are respectively accommodated in the corresponding first accommodating holes.

Preferably, the second supporting framework further comprises second accommodating holes respectively running through two second side walls along the direction perpendicular to the optical axis, and the anti-shake magnetic coils are accommodated in the corresponding second accommodating holes.

Preferably, the lens driving device further comprises a shell covering the second supporting framework, and the metal sheets are fixed on an inner side of the shell.

Compared with the related art, in the lens driving device of the present invention, the anti-shake magnets are respectively fixed on two adjacent first side walls of the first supporting framework, and the anti-shake coils are respectively fixed on two adjacent second side walls; each anti-shake coil is opposite to and spaced from one anti-shake magnet, and they jointly drive the first supporting framework to deflect around the first direction or the second direction that is perpendicular to the optical axis direction; meanwhile, the metal sheets and the two anti-shake magnets are opposite to and spaced from each other so that the metal sheets are located at a side edge of the lens driving device and generate mutual magnetic attraction with the anti-shake magnets, so as to provide an anti-shake restoring force, thus realizing an optical image stabilization (OIS) function perpendicular to the optical axis direction. The structure that realizes the anti-shake restoring force under the combined action of the above metal sheets and the anti-shake magnets is located at a side edge of the lens driving device, which will not occupy the thickness of the lens driving device along the optical axis direction and is conductive to thinning, further, the structure that realizes the anti-shake restoring force is simple in design, compared with a metal spherical surface contact structure that realizes the anti-shake function in the related art, this structure effectively simplifies the assembling method and reduces the production cost.

BRIEF DESCRIPTION OF THE DRAWINGS

In order to describe the technical solutions in the embodiments of the present invention more clearly, accompanying drawings required to be used in the descriptions of the embodiments will be briefly introduced below. Obviously, the drawings in the illustration below are merely some embodiments of the present invention. Those ordinarily skilled in the art also can acquire other drawings according to the provided drawings without doing creative work.

DETAILED DESCRIPTION OF THE EMBODIMENTS

Figure 1:
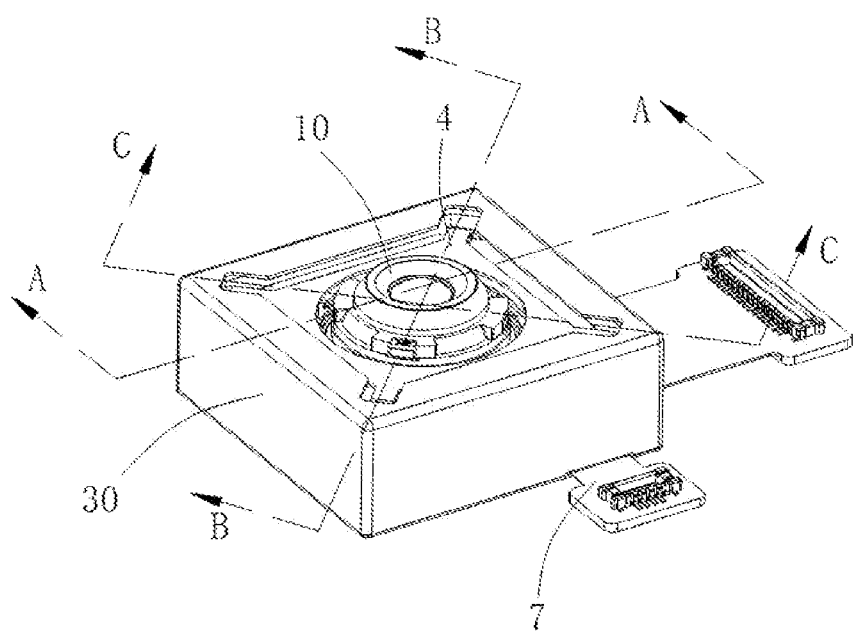
FIG. 1 is a schematic diagram of a three-dimensional structure of a lens driving device of the present invention.
Figure 1:
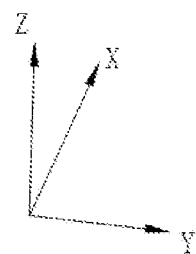
Figure 2:
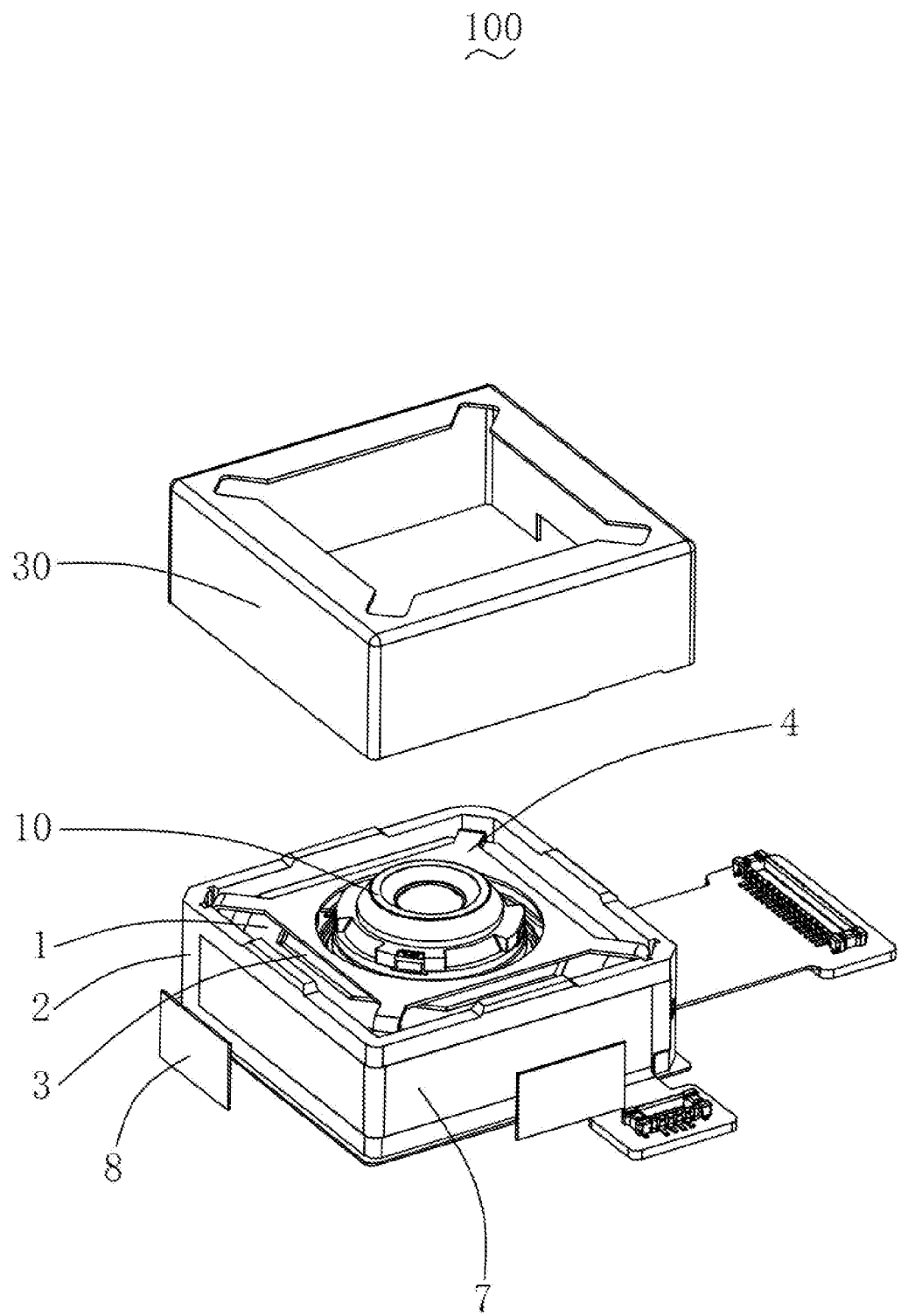
FIG. 2 is a schematic diagram of a partially exploded structure of a lens driving device of the present invention.
Figure 3:
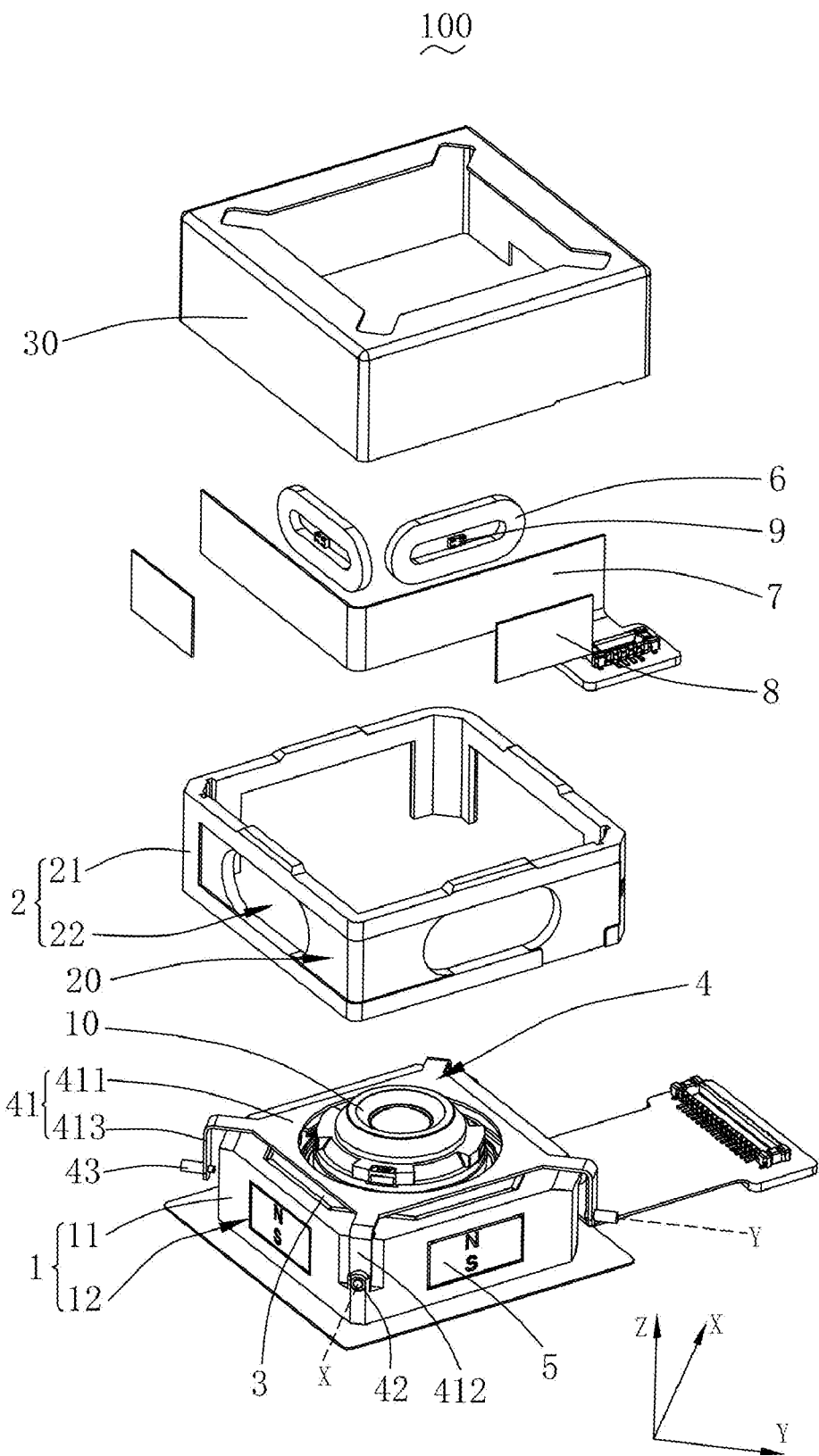
FIG. 3 is a schematic exploded diagram of another part of structure of a lens driving device of the present invention.
Figure 4:
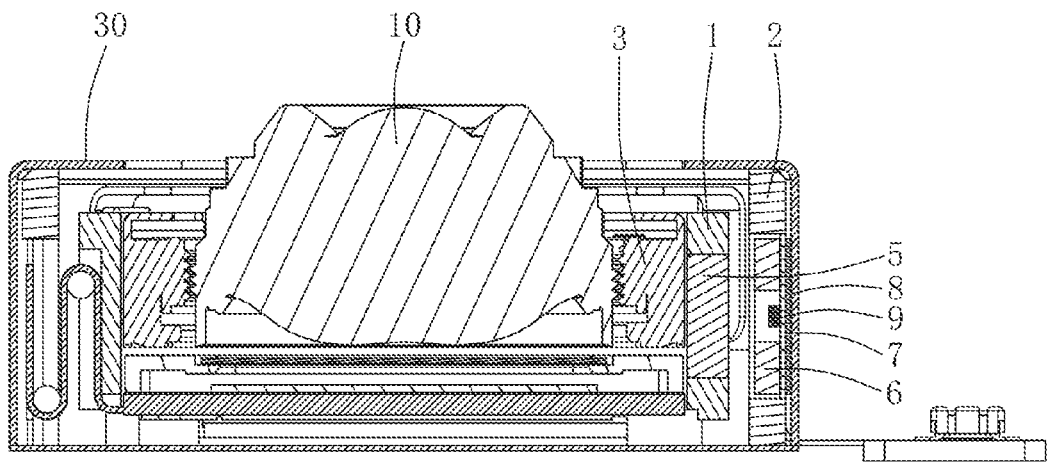
FIG. 4 is a sectional view along line A-A in FIG. 1.
Figure 5:
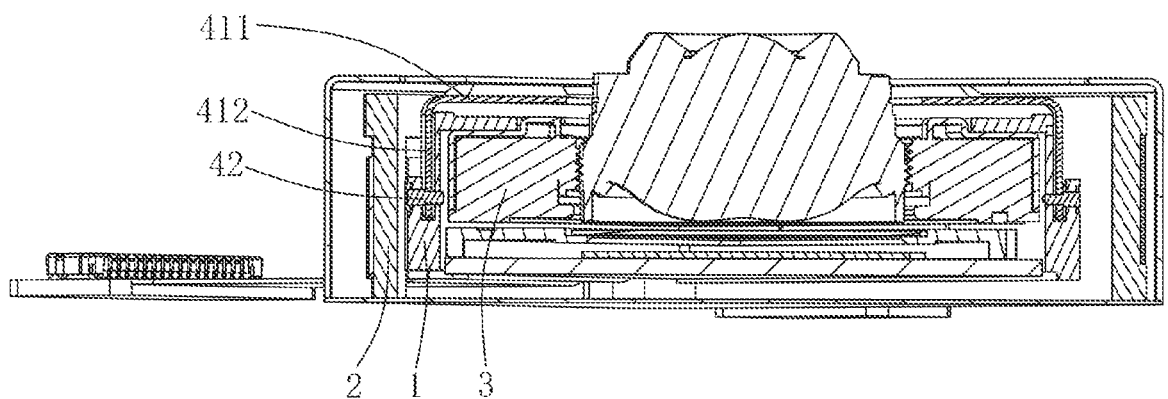
FIG. 5 is a sectional view along line B-B in FIG. 1.
Figure 6:
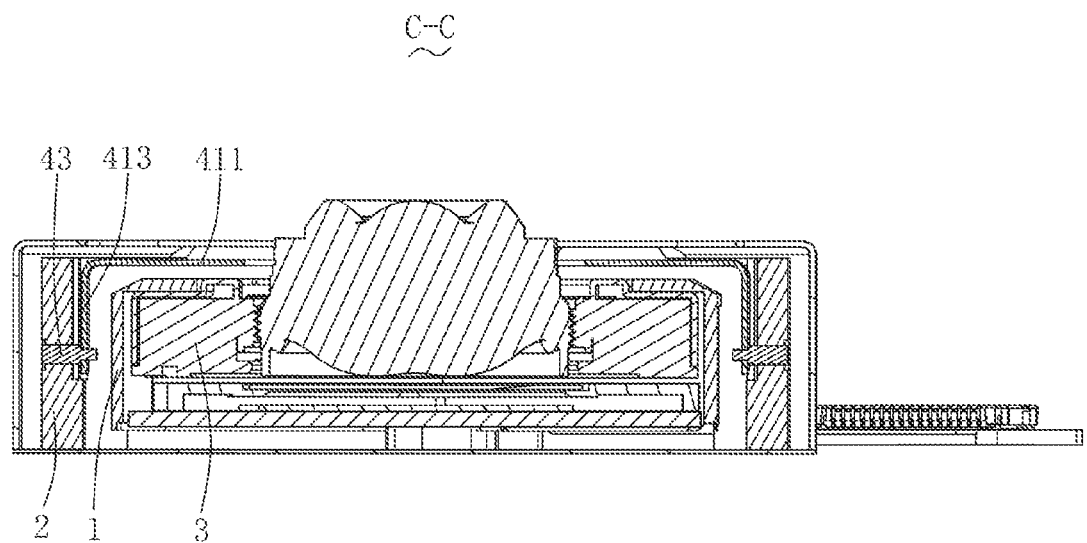
FIG. 6 is a sectional view along line C-C in FIG. 1.

The technical solutions in the embodiments of the present invention will be described clearly and completely below with reference to the drawings in the embodiments of the present invention. Obviously, the embodiments described herein are only part of the embodiments of the present invention, not all the embodiments. Based on the embodiments in the present disclosure, all other embodiments obtained by those of ordinary skill in the art without creative work shall fall within the protection scope of the present disclosure.

Referring to FIGS. 1-6, the present invention provides a lens driving device 100 including the first supporting framework 1, the second supporting framework 2, a lens barrel 3, a bracket assembly 4, an anti-shake magnet 5, an anti-shake coil 6, a flexible printed circuit 7, a metal sheet 8, and a hall sensor 9.

The first supporting framework 1 is enclosed by the first side wall 11 into a rectangular structure having an accommodating space.

The second supporting framework 2 is enclosed by the second side wall 21 into a rectangular structure, sleeved on the first supporting framework 1, and spaced from the first supporting framework 1.

The lens barrel 3 accommodated in the accommodating space of the first supporting framework 1, connected with the first supporting framework 1, and configured for mounting a lens 10.

The bracket assembly 4 is rotatably connected with the first supporting framework 1 so that the first supporting framework 1 may rotate around a first direction relative to the bracket assembly 4. The bracket assembly 4 is rotatably connected with the second supporting framework 2 and suspends the first supporting framework 1 in the second supporting framework 2 so that the bracket assembly 4 may drive the first supporting framework 1 to jointly rotate around a second direction relative to the second supporting framework 2. In particular, the first direction and the second direction are perpendicular to the optical axis and are respectively directions parallel to two diagonals of the first supporting framework 1. In this embodiment, it is defined that the first direction is an X direction, the second direction is a Y direction, and the optical axis direction is a Z direction. The first direction and the second direction are respectively directions parallel to the two diagonals of the first supporting framework 1. In this embodiment, the first direction is perpendicular to the second direction.

There are at least two anti-shake magnets 5, and they are respectively fixed on two adjacent first side walls 11. More preferably, the first supporting framework 1 further comprises a plurality of first accommodating holes 12 respectively running through the two first side walls 11 along a direction perpendicular to an optical axis, and the anti-shake magnets 5 are respectively accommodated in the corresponding first accommodating holes 12, so as to reduce occupation of a radial space of the lens driving device 100 and reduce its size in a radial direction (the direction perpendicular to the optical axis).

There are at least two anti-shake coils 6 and they are respectively fixed on two adjacent second side walls 21. Each anti-shake coil 6 and the corresponding anti-shake magnet 5 are opposite to and spaced from each other and jointly drive the first supporting framework 1 to deflect around the first direction or the second direction, thus driving, through the first supporting framework 1, the lens barrel 3 to deflect along the first direction or the second direction.

More preferably, the second supporting framework 2 further comprises a plurality of second accommodating holes 22 respectively running through the two second side walls 21 along the direction perpendicular to the optical axis, and the anti-shake magnetic coils 6 are respectively accommodated in the corresponding second accommodating holes 22, so as to reduce occupation of the radial space of the lens driving device 100 and reduce its size in the radial direction (the direction perpendicular to the optical axis).

When currents are in the same direction during energization of the two anti-shake coils 6, the two anti-shake coils 6 generate a thrust to the anti-shake magnets 5 which pushes the anti-shake magnets 5 to drive the lens barrel 3 to rotate around one shaft perpendicular to the optical axis direction. When the currents are in opposite directions during the energization of the two anti-shake coils 6, the two anti-shake coils 6 generate a torsion to the anti-shake magnets 5, which pushes the anti-shake magnets 5 to drive the lens barrel 3 to rotate around the other shaft perpendicular to the optical axis direction.

In particular, in this embodiment, the bracket assembly 4 comprises a bracket 41, two first guide pillars 42, and two second guide pillars 43.

The bracket 41 comprises a rectangular annular bracket body 411, a plurality of first supporting walls 412 respectively extending in a bent manner from one group of diagonal positions of the bracket body 411, and a plurality of second supporting walls 413 respectively extending in a bent manner from the other group of diagonal positions of the bracket body 411. The first supporting walls 412 and the second supporting walls 413 are spaced from the first supporting framework 1. In this embodiment, the bracket 41 is made of a steel sheet and has a good supporting effect on the lens barrel 3.

There are two first guide pillars 42 and they extend along the first direction (i.e., the X-axis direction) and they are spaced from each other; and the two second guide pillars 43 extend along the second direction (i.e., the Y-axis direction) and are spaced from each other.

The bracket body 411 is located at the top end of the lens barrel 3 and is spaced from the lens barrel 3; the first supporting walls 412 are rotatably connected to the first supporting framework 1 through the first guide pillars 42 so that the bracket 41 may axially rotate along the X axis relative to the first supporting framework 1, that is, the bracket 41 axially rotates along the X axis relative to the lens barrel 3. The second supporting walls 413 are arranged between the first supporting framework 1 and the second supporting framework 2 in a spacing manner and are rotatably connected to the second supporting framework 2 through the second guide pillars 43 so that the bracket 41 may drive the first supporting framework 1 to jointly axially rotate along the Y axis relative to the second supporting framework 2.

That is, when the currents are in the same direction during the energization of the two anti-shake coils 6, the two anti-shake coils 6 generate a thrust to the anti-shake magnets 5, which pushes the anti-shake magnets 5 to drive the first supporting framework 1 to rotate around a shaft parallel to the second direction (the Y-axis direction). When the currents are in opposite directions during the energization of the two anti-shake coils 6, the two anti-shake coils 6 generate a torsion to the anti-shake magnets 5, which pushes the anti-shake magnets 5 to drive the first supporting framework 1 to rotate around a shaft parallel to the first direction (X-axis direction). The lens barrel 3 is connected to the first supporting framework 1 and rotates synchronously with the first supporting framework 1, thus realizing anti-shake function compensation for the lens barrel 3.

The flexible printed circuit 7 is fixed at the peripheral side of the second supporting framework 2 and electrically connected with the anti-shake coils 6 to provide the currents to the anti-shake coils 6. More preferably, the peripheral sides of the second side walls 21 of the second supporting framework 2 are inwards sunken to form a mounting space 20, and the anti-shake coils 6 may be arranged in the mounting space 20, so that the thickness of the second supporting framework 2 can be fully used to reduce the radial size of the lens driving device 100.

The two metal sheets 8 are respectively opposite to and spaced from the two anti-shake magnets 5. For example, the metal sheets 8 are fixed on a side of the flexible printed circuit 7 away from the anti-shake coils 6 and are opposite to the anti-shake magnets 5. The metal sheets 8 and the anti-shake magnets 5 generate mutual magnetic attraction, thus providing an anti-shake restoring force. Therefore, the anti-shake magnet 5, the anti-shake coils 6, and the metal sheets 8 work together to realize an anti-shake function. The structure that realizes the anti-shake function is simple, and the assembling is simple. The structure that realizes the anti-shake restoring force by the combined action of the metal sheets 8 and the anti-shake magnets 5 is arranged at the side edge of the lens driving device 100, which will not occupy the thickness of the lens driving device 100 along the optical axis direction and is conductive to thinning structure. Furthermore, the structure that realizes the anti-shake restoring force is simple in design. Compared with a metal spherical surface contact structure that realizes the anti-shake function in the related art, this structure effectively simplifies the assembling method and reduces the production cost. In this embodiment, the metal sheets 8 are steel sheets.

It should be appreciated that a drive coil and drive magnet that realize an AF function are similar to the structures in the related art, and no specific descriptions will be made here.

Figure 7:
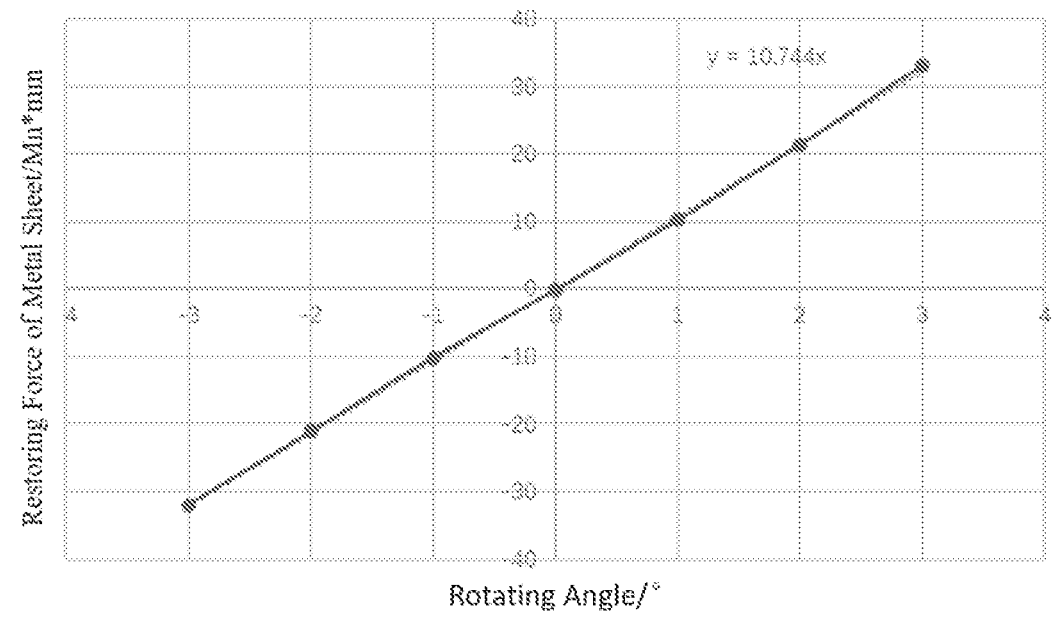
FIG. 7 is a curve chart illustrating that, in the lens driving device of the present invention, metal sheets provide a restoring force when a rotating center of a lens barrel is located in a center position of anti-shake magnet.

More preferably, in this embodiment, a rotating center of the lens barrel 3 is further located in a center position of the two anti-shake magnet 5s, i.e., the center line of the anti-shake magnets 5 (the center line is perpendicular to the optical axis direction), central axes of the first guide pillars 42, and central axes of the second guide pillars 43 are flush in the optical axis direction. That is, the center line of the anti-shake magnets 5, the central axes of the first guide pillars 42, and the central axes of the second guide pillars 43 are located on the same plane perpendicular to the optical axis. At this time, as shown in FIG. 7, the restoring force is zero when the metal sheets 8 are at initial positions. When the lens driving device 100 is not powered on, the rotating center of the lens barrel 3 is located at the center position of the two anti-shake magnets 5. In the rotating process of the lens barrel 3, the restoring force provided by the metal sheets 8 is linear, which effectively improves the stabilization of the OIS function.

The lens driving device 100 further includes a shell 30 covering the second supporting framework 2 which is configured to protect other devices. Accordingly, the metal sheets 8 may be fixed on an inner side of the shell 30 so that the metal sheets 8 are opposite to the anti-shake magnets 5.

There are two hall sensors 9 and they are respectively mounted on the side of the flexible printed circuit 7 close to the anti-shake magnets 5 and are electrically connected with the flexible printed circuit 7 and used for detecting displacements of the lens barrel 3 in the first direction (X-axis direction) and the second direction (Y-axis direction).

Compared with the related art, in the lens driving device of the present invention, the anti-shake magnets are respectively fixed on two adjacent first side walls of the first supporting framework along the optical axis direction perpendicular to the lens barrel, and the anti-shake coils are respectively fixed on two adjacent second side walls along the direction perpendicular to the optical axis; each anti-shake coil is opposite to and spaced from one anti-shake magnet, and they jointly drive the first supporting framework to deflect around the first direction or the second direction that is perpendicular to the optical axis direction; meanwhile, the metal sheets and the two anti-shake magnets are opposite to and spaced from each other so that the metal sheets are located at the side edge of the lens driving device and generate mutual magnetic attraction with the anti-shake magnets, so as to provide the anti-shake restoring force, thus realizing an optical image stabilization (OIS) function perpendicular to the optical axis direction. The structure that realizes the anti-shake restoring force under the combined action of the above metal sheets and the anti-shake magnet is located at a side edge of the lens driving device, which will not occupy the thickness of the lens driving device along the optical axis direction and is conductive to thinning. Furthermore, the structure that realizes the anti-shake restoring force is simple in design. Compared with a metal spherical surface contact structure that realizes the anti-shake function in the related art, this structure effectively simplifies the assembling method and reduces the production cost.

The embodiments of the present invention are described above only. It should be noted that those of ordinary skill in the art can further make improvements without departing from the concept of the present invention. These improvements shall all fall within the protection scope of the present invention.

What is claimed is:

1. A lens driving device comprising:
a first supporting framework enclosed by a first side wall into a rectangular structure having an accommodating space;
a second supporting framework enclosed by a second side wall into a rectangular structure, wherein the second supporting framework is sleeved on the first supporting framework and spaced apart from the first supporting framework;
a lens barrel accommodated in the accommodating space, wherein the lens barrel is connected with the first supporting framework and configured for mounting a lens;
a bracket assembly which is rotatably connected with the first supporting framework in such a way that the first supporting framework is rotatable around a first direction relative to the bracket assembly, and the bracket assembly is rotatably connected with the second supporting framework and suspends the first supporting framework in the second supporting framework in such a way that the bracket assembly is capable of driving the first supporting framework to jointly rotate around a second direction relative to the second supporting framework, the first direction and the second direction being perpendicular to an optical axis and respectively parallel to two diagonals of the first supporting framework;
at least two anti-shake magnets respectively fixed on two adjacent first side walls;
at least two anti-shake coils respectively fixed on two adjacent second side walls, each anti-shake coil and one corresponding anti-shake magnet are opposite to and spaced apart from each other and jointly drive the first supporting framework to deflect around the first direction or the second direction;
a flexible printed circuit fixed at a peripheral side of the second supporting framework and electrically connected with the anti-shake coils; and
at least two metal sheets respectively opposite to and spaced apart from two anti-shake magnets and generating mutual magnetic attraction with the anti-shake magnets;
wherein the bracket is made of a steel sheet and the bracket assembly is assembled with the first supporting framework and the second supporting framework.

2. The lens driving device of claim 1, wherein the bracket assembly comprises a bracket, two first guide pillars, and two second guide pillars;
wherein the bracket comprises a rectangular annular bracket body, a plurality of first supporting walls respectively extending in a bent manner from one group of diagonal positions of the bracket body, and a plurality of second supporting walls respectively extending in a bent manner from the other group of diagonal positions of the bracket body; the plurality of first supporting walls and the plurality of second supporting walls are spaced apart from the first supporting framework;
the two first guide pillars extend along the first direction and are spaced apart from each other;
the two second guide pillars extend along the second direction and are spaced apart from each other; the bracket body is located at a top end of the lens barrel and is spaced apart from the lens barrel; the plurality of first supporting walls are rotatably connected to the first supporting framework through the first guide pillars; the second supporting walls are arranged between the first supporting framework and the second supporting framework in a spacing manner and are rotatably connected to the second supporting framework through the second guide pillars.

3. The lens driving device of claim 2, wherein a central line of the anti-shake magnets, central axes of the first guide pillars, and central axes of the second guide pillars are flush in the optical axis direction.

4. The lens driving device of claim 1, wherein the first supporting framework further comprises a plurality of first accommodating holes respectively running through two first side walls along the direction perpendicular to the optical axis, and the anti-shake magnets are respectively accommodated in the corresponding first accommodating holes.

5. The lens driving device of claim 1, wherein the second supporting framework further comprises a plurality of second accommodating holes respectively running through two second side walls along the direction perpendicular to the optical axis, and the anti-shake magnetic coils are accommodated in the corresponding second accommodating holes.

6. The lens driving device of claim 1, wherein the lens driving device further comprises a shell covering the second supporting framework, and the metal sheets are fixed on an inner side of the shell.

* * * * *